United States Patent
Mariyani et al.

(10) Patent No.: US 12,160,747 B1
(45) Date of Patent: Dec. 3, 2024

(54) NETWORK ACCESS BASED ON DEVICE TYPE

(71) Applicant: T-MOBILE INNOVATIONS LLC, Overland Park, KS (US)

(72) Inventors: Anil Kumar Mariyani, Ashburn, VA (US); Chris Jensen, Snoqualmie, WA (US); Tupalli Shruthisagar, Aldie, VA (US)

(73) Assignee: T-MOBIILE INNOVATIONS LLC, Overland Park, KS (US)

(*) Notice: Subject to any disclaimer, the term of this patent is extended or adjusted under 35 U.S.C. 154(b) by 431 days.

(21) Appl. No.: 17/394,219

(22) Filed: Aug. 4, 2021

(51) Int. Cl.
*H04W 12/37* (2021.01)
*H04W 8/02* (2009.01)
*H04W 12/71* (2021.01)
*H04W 24/08* (2009.01)
*H04W 28/02* (2009.01)
*H04W 48/16* (2009.01)

(52) U.S. Cl.
CPC .......... *H04W 12/37* (2021.01); *H04W 8/02* (2013.01); *H04W 12/71* (2021.01); *H04W 24/08* (2013.01); *H04W 28/0268* (2013.01); *H04W 48/16* (2013.01)

(58) Field of Classification Search
CPC ....... H04W 12/37; H04W 8/02; H04W 12/71; H04W 24/08; H04W 28/0268; H04W 48/16
See application file for complete search history.

(56) References Cited

U.S. PATENT DOCUMENTS

| | | | |
|---|---|---|---|
| 7,570,941 B2 | 8/2009 | Mahajan | |
| 9,094,839 B2 | 7/2015 | Shaikh et al. | |
| 10,749,867 B1 | 8/2020 | Litani | |
| 10,951,461 B2 | 3/2021 | Ganu et al. | |
| 2007/0077912 A1* | 4/2007 | Mahajan | H04W 8/22 455/410 |
| 2016/0029246 A1 | 1/2016 | Mishra et al. | |

(Continued)

FOREIGN PATENT DOCUMENTS

| | | |
|---|---|---|
| CN | 101540758 A | 9/2009 |
| CN | 105636049 A | 6/2016 |

(Continued)

OTHER PUBLICATIONS

Singh, N., "What is the 5G Access and Mobility Management Function (AMF)?", Retrieved from Internet URL : https://techcommunity.microsoft.com/t5/azure-for-operators-blog/what-is-the-5g-access-and-mobility-management-function-amf/ba-p/3707685, pp. 5 (Jan. 5, 2023).

(Continued)

*Primary Examiner* — Trong H Nguyen
(74) *Attorney, Agent, or Firm* — Shook, Hardy & Bacon L.L.P.

(57) ABSTRACT

Embodiments of the present disclosure are directed to systems and methods for group-based filtering of user devices on a wireless network. Upon a request from a user device to access a requested network service, a device specific identifier associated with the user device is used to determine one or more groups associated with the user device. Based on any access restrictions for the one or more groups associated with the user device, the requested network service may be selectively authorized or provided.

16 Claims, 4 Drawing Sheets

(56) References Cited

U.S. PATENT DOCUMENTS

| | | | |
|---|---|---|---|
| 2016/0099963 A1* | 4/2016 | Mahaffey | G06F 21/554 |
| | | | 726/25 |
| 2017/0006522 A1* | 1/2017 | Nishimura | H04W 4/08 |
| 2018/0007534 A1* | 1/2018 | Thakolsri | H04W 24/04 |
| 2018/0034814 A1* | 2/2018 | Tachikawa | H04W 12/062 |
| 2019/0297083 A1* | 9/2019 | Li | H04L 63/08 |
| 2020/0187048 A1 | 6/2020 | Mishra et al. | |
| 2021/0144555 A1 | 5/2021 | Kim et al. | |
| 2021/0203575 A1* | 7/2021 | Hanetz | H04L 63/14 |
| 2021/0273783 A1* | 9/2021 | Park | H04W 12/041 |
| 2021/0367888 A1* | 11/2021 | Ramamurthi | H04W 28/0289 |
| 2022/0006756 A1* | 1/2022 | Ramaswamy | H04L 45/64 |
| 2022/0345914 A1* | 10/2022 | Kim | H04L 43/0894 |

FOREIGN PATENT DOCUMENTS

| | | | | |
|---|---|---|---|---|
| EP | 2334011 B1 | | 2/2013 | |
| JP | 2020005102 A | * | 1/2020 | |
| KR | 20100072973 A | * | 7/2010 | H04W 36/0005 |
| KR | 20210050978 A | * | 5/2021 | |
| WO | 2017/092823 A1 | | 6/2017 | |

OTHER PUBLICATIONS

Non-Final Office Action dated May 11, 2023 in U.S. Appl. No. 17/394,217, 32 pages.

"Equipment Identity Register (EIR)", Broadforward BV, Retrieved from Internet URL : https://www.broadforward.com/equipment-identity-register-eir/, Mar. 1, 2021, pp. 4 (2022).

Notice of Allowance received for U.S. Appl. No. 17/394,217, mailed on Nov. 6, 2023, 28 pages.

Robocall Strike Force Report, Oct. 26, 2016, obtained from <https://transition.fcc.gov/cgb/Robocall-Strike-Force-Final-Report.pdf>, retrieved on Oct. 20, 2023 (Year: 2016).

* cited by examiner

NETWORK ACCESS BASED ON DEVICE TYPE

SUMMARY

The present disclosure is directed, in part to performing device-type based filtering to a wireless network, substantially as shown and/or described in connection with at least one of the Figures, and as set forth more completely in the claims.

According to various aspects of the technology, network access to a device is based on device-type information. With the ever-growing number and diversity of wirelessly connected devices, wireless networks are becoming inherently more vulnerable to vectors of attack or exploitation. Conventionally, network access for devices was at least partially controlled by completing device-unique identifier checks, in order to determine if a particular device was permitted to access the network (e.g., on a whitelist), was restricted (e.g., on a greylist), or prohibited (e.g., on a blacklist). These access lists are typically shared between network operators, and are manually updated, leading them to be slowly adaptive tools, providing network operators with a narrow and precise approach to protecting their networks. Though narrowly-tailored access controls may be desirable in some situations, a broadly-applicable access control may be better suited to other situations.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached Figures, which are intended to be exemplary and non-limiting, wherein.

DETAILED DESCRIPTION

Figure 1:
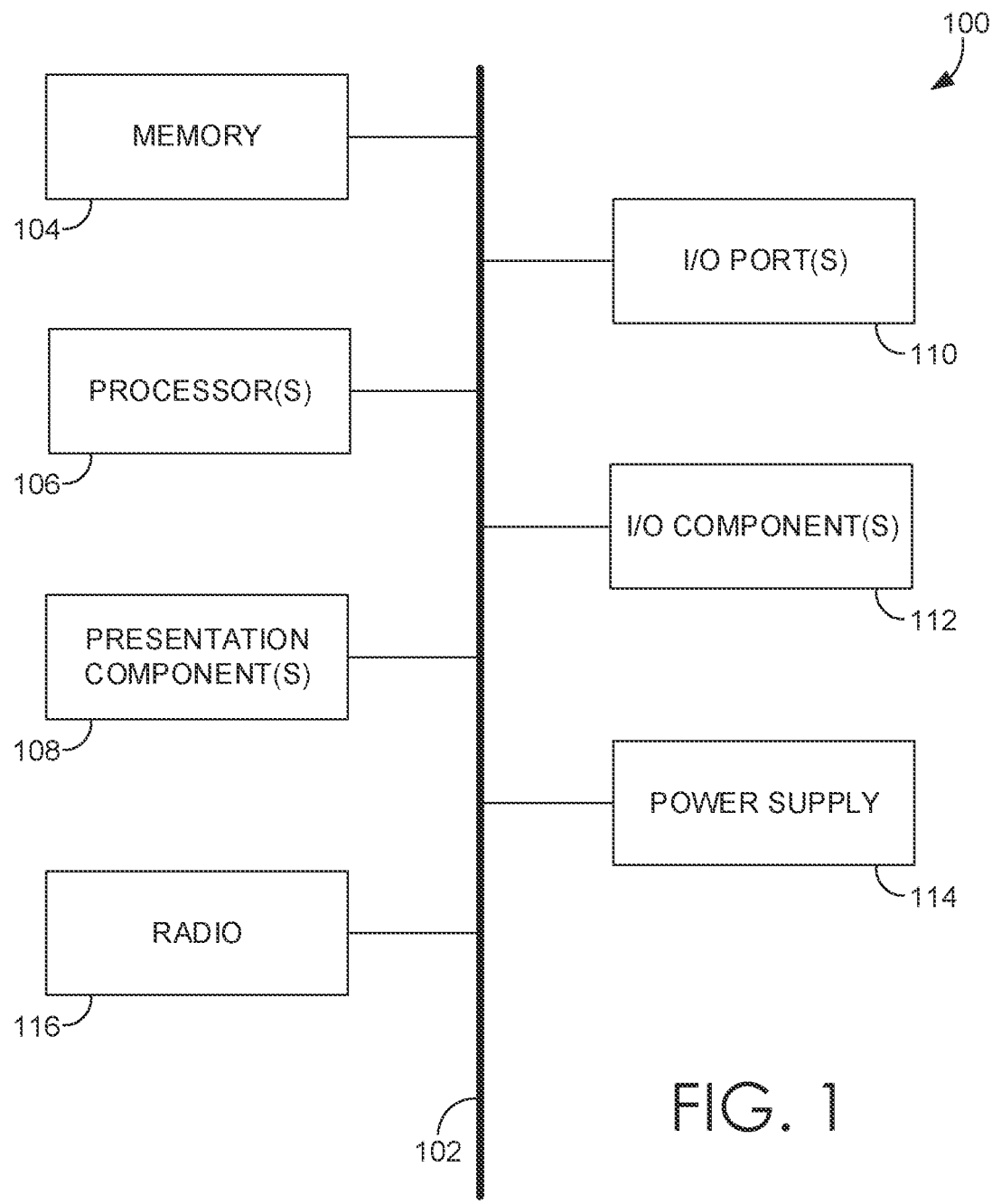
FIG. 1 illustrates an exemplary computing device for use with the present disclosure.

The subject matter of embodiments of the invention is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. Unless otherwise indicated, acronyms are used in their common sense in the telecommunication arts as one skilled in the art would readily comprehend. Further, various technical terms are used throughout this description. An illustrative resource that fleshes out various aspects of these terms can be found in Newton's Telecom Dictionary, 31st Edition (2018).

Embodiments of our technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media. Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media. Implementations of the present disclosure may be described in the general context of computer code or machine-useable instructions, including computer-executable instructions such as program components, being executed by a computer or other computer processing component. Generally, program components, including routines, programs, objects, components, data structures, and the like, refer to code that performs particular tasks or implements particular abstract data types. Implementations of the present disclosure may also be practiced in distributed computing environments where tasks are performed by remote-processing devices that are linked through a communications network.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices and may be considered transitory, non-transitory, or a combination of both. These memory components can store data momentarily, temporarily, or permanently.

Communications media typically store computer-useable instructions-including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, network operators maintain, and may share, lists of specific user devices that have reduced access to their networks, whether because they are fraudulent, spammers, security threats, or the like. When a device requests access to a particular network (e.g., during network/ cell attach), a device-specific identifier is utilized to perform a device-specific identifier access list query, and it may be permitted to operate nominally based on the device's unique identifier (e.g., an international mobile equipment identity (IMEI)) not being found on a restricted access list, such as a grey or black list (notwithstanding other policy restrictions such as throttling when data caps have been exceeded, limiting video stream rates, and the like). The conventionally manual task of identifying and modifying network access for a particular user device represented a narrow and precise solution to maintaining network integrity and fidelity. However, modern wireless networks are confronted by an ever-increasing number and diversity of devices that makes narrow solutions ineffective or inefficient when a problem is not device-specific.

In order to solve this problem, the present disclosure is directed to systems, methods, and computer readable media that provides a secondary access check, beyond the device-specific checks that are currently implemented. When a particular user device requests access to a network (e.g., a 5G network), the request call flow includes certain identifying information; relevantly, that information includes a device-specific identifier such as an IMEI. Using the device-specific identifier, device type information is obtained from a first data repository. In addition to the device-specific identifier access list query, the device type identifier is queried against a device type identifier access list in order to determine if that device type is authorized to access a particular network (or a particular network feature). By forcing user devices to perform a second, device type check, network operators are enabled to implement broader network access limitations much more quickly. While using the conventional, narrow solution may be an effective solution for certain access management problems, the present disclosure is markedly more effective when access management becomes necessary for entire groups of devices.

Accordingly, a first aspect of the present disclosure is directed to a method for group-based device filtering in a wireless communication network, the method comprising receiving, at a radio access network, a request for a network service from a user device, wherein the user device is associated with a device specific identifier. The method further comprises determining one or more groups associated with the device specific identifier. The method further comprises determining the one or more groups are subject to an access restriction for the network service.

A second aspect of the present disclosure is directed to a system comprising a first data repository, a second data repository, a network function, and an equipment identity register. The equipment identity register comprises one or more computer components configured to perform a method comprising receiving, via the network function a request from a user device to access a network service. The method further comprises determining, based on querying the first data repository with a device specific identifier of the user device, one or more groups associated with the user device. The method further comprises determining, based on querying the second data repository with the one or more groups associated with the user device, an access restriction status of the user device.

According to another aspect of the technology described herein, one or more computer-readable media is provided having computer-executable instructions embodied thereon that, when executed, cause the one or more processors to perform a method comprising receiving, from a radio access network, a request for a network service from a user device, wherein the user device is associated with a device specific identifier. The method further comprises determining one or more groups associated with the device specific identifier and determining an access restriction status for the one or more groups to access the network service.

Referring to FIG. 1, a diagram is depicted of an exemplary computing environment suitable for use with implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 may be a UE, WCD, or other user device, capable of two-way wireless communications with an access point. Some non-limiting examples of the computing device 100 include equipment types identified by the GSMA, including mobile/ feature phones, smart phones, tablets, IoT devices, wearable devices, dongles, modems, and WLAN routers, each of which may have any one or more components depicted in FIG. 1.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

Radio 116 represents a radio that facilitates communication with a wireless telecommunications network. In aspects, the radio 116 utilizes one or more transmitters, receivers, and antennas to communicate with the wireless telecommunications network on a first downlink/uplink channel. Though only one radio is depicted in FIG. 1, it is expressly conceived that the computing device 100 may have more than one radio, and/or more than one transmitter, receiver, and antenna for the purposes of communicating with the wireless telecommunications network on multiple discrete downlink/uplink channels, at one or more wireless nodes. Illustrative wireless telecommunications technologies include CDMA, GPRS, TDMA, GSM, and the like. Radio 116 might additionally or alternatively facilitate other types of wireless communications including Wi-Fi, WiMAX, LTE, or other VoIP communications. As can be appreciated, in various embodiments, radio 116 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Figure 2:
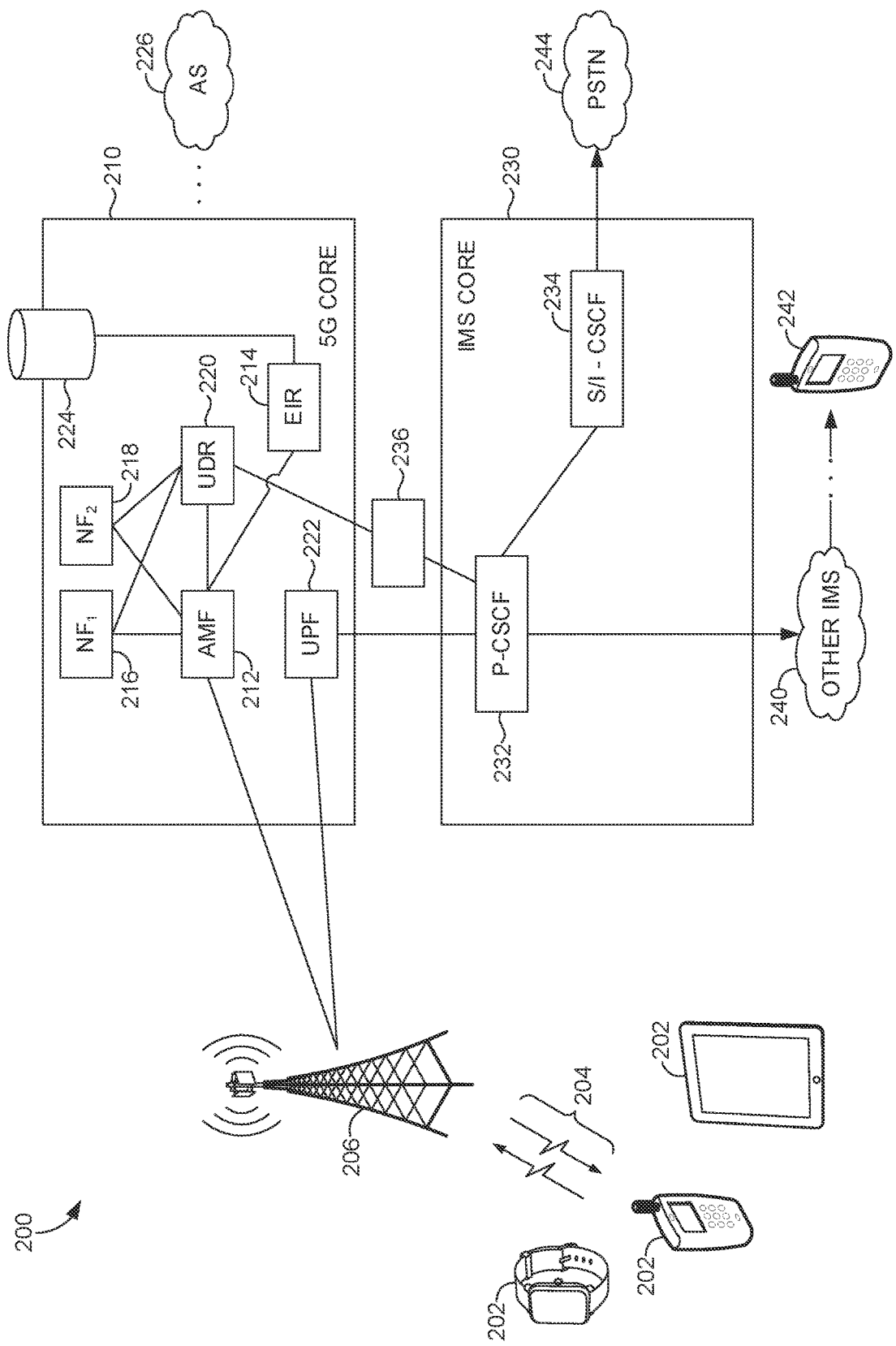
FIG. 2 illustrates a diagram of an exemplary network environment in which implementations of the present disclosure may be employed.

Turning now to FIG. 2, an exemplary network environment is illustrated in which implementations of the present disclosure may be employed. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

Network environment 200 represents a high level and simplified view of relevant portions of a modern wireless telecommunication network. At a high level, the network environment 200 may generally be said to comprise one or more UEs, such as a first UE 202 and/or a second UE 242, a radio access network (RAN) 206, a network core 210, and an IMS core 230, though in some implementations, it may not be necessary for certain features to be present. For example, in some aspects, the network environment 200 may not comprise a distinct IMS core 230, but rather may implement one or more features of the IMS core 230 within other portions of the network or may not implement them at all, depending on various carrier preferences. The network environment 200 is generally configured for wirelessly connecting the first UE 202 to other UEs, such as the second UE 242, to other telecommunication networks such as a publicly-switched telecommunication network (PSTN) 244, or data or services that may be accessible on one or more application servers or other functions, nodes, or servers not pictured in FIG. 2 so as not to obscure the focus of the present disclosure. As illustrated generally, the first UE 202 may take any number of forms, including a tablet, phone, or wearable device, or any other device discussed with respect to FIG. 1. In some aspects, the first UE 202 may specifically not be a conventional telecommunications device (i.e., device that is capable of placing and receiving voice calls), but may instead take the form of a device that only utilizes wireless network resources in order to transmit or receive data; such devices may include IoT devices (e.g., smart appliances, thermostats, locks, smart speakers, lighting devices, smart receptacles, and the like).

The RAN 206 is generally configured to transmit and receive one or more signals 204 between a base station and the first UE 202. The one or more signals 204 comprise one or more uplink signals for which the RAN 206 is configured to receive from the first UE 202. In response to receiving certain requests from the first UE 202, the RAN 206 may communicate with the network core 210. For example, in order for the first UE 202 to connect to a desired network service (e.g., PSTN call, voice over LTE (VOLTE) call, voice over new radio (VoNR), data, or the like), the first UE 202 may communicate an attach request to the RAN 206, which may, in response may communicate a registration request to the network core 210. The RAN 206 may take the form of a home network (i.e., a RAN belonging to or affiliated with the carrier associated with the first UE 202) or a visiting/roaming network (i.e., a RAN belonging to or operated by an entity other than the carrier associated with the first UE 202, but which, in certain conditions, may provide extended wireless access to the first UE 202 beyond the reaches of the home network). Further, though the RAN 206 is illustrated as a single wireless access point, the RAN 206 may comprise a multi-hop wireless system, in itself; for example, the RAN 206 may comprise a small cell or relay, to which the first UE 206 is connected and a backhaul access point (e.g., an e- or gNodeB).

Relevant to the present disclosure, one or more modules of the network core 210 may work cooperatively to determine whether the first UE 202 is authorized to access the desired network service. As used herein, the terms "function" and "module" are used to describe a computer processing component and/or one or more computer executable services being executed on one or more computer processing components. For example, the network core 210 may comprise modules or functions that include any one or more of a core access and mobility management function (AMF) 212, an equipment identity register (EIR) module 214, a first network function (NF) 216, a second NF 218, a unified data repository (UDR) 220, and a user plane function (UPF) 222. Notably, the preceding nomenclature is used with respect to the 3GPP 5G architecture; in other aspects, each of the preceding functions and/or modules may take different forms, including consolidated or distributed forms that perform the same general operations. For example, the AMF 212 in the 3GPP 5G architecture is configured for various functions relating to security and access management and authorization, including registration management, connection management, paging, and mobility management; in other forms, such as a 4G architecture, the AMF 212 of FIG. 2 may take the form of a mobility management entity (MME). The network core 210 may be generally said to authorize rights to and facilitate access to an application server/service 226, requested by the first UE 202.

The system 200 additionally comprises a data storage 224, which may referred to herein as an operator's internal device management (OIDM) database (though this should not necessarily be understood to limit the data storage to being internal to an operator, nor in the form of a database). The data storage 224 is generally configured to store information regarding policies relating to device groups (e.g., types, SKUs, versions, or the like); in other words, the data storage is configure to store information that identifies the first UE 202 based on its membership in a particular group. The first UE 202 may be a member in numerous different groups at the same time; said device groups may include a group based on a make, model, or distinct attribute of the first UE (which may generically be referred to herein as being represented by a store keeping unit, a software version (e.g., of the first UE's operating system), a firmware version, a hardware version (e.g., identifying the first UE has having a particular chipset, radio, or the like), a type (e.g., smart phone, table, IoT device, wearable, dongle, modem, WLAN router), or any other group identifier desired by an operator. In one aspect, the device groups may be based on a type allocation code of the first UE 202, as assigned by a body such as the GSMA. Though illustrated as residing within the network core 210, the data storage 224 may be located within the network core 210, on the edge of the network core, in the IMS core 230, or in a stand-alone location beyond the reaches of either the network core 210 or the IMS core 230. Regardless of its particular location, the data storage 224 may have a direct interface with the EIR 214, which may be referred to herein as an Neir interface. The data storage 224 may additionally be configured with an auditing interface that allows a network operator to directly interface with the data storage 224 in order to manage, audit, and/or monitor information or activity at the data storage 224. For example, the auditing interface may take the form of a communicative connection between the data storage 224 and a network operating center, wherein the auditing interface permits the network operator to add, modify, remove, monitor, query, or perform auditing activity on the information of the data storage 224. In practice, this facilitates the network operator to add or remove, for example, access restrictions for entire groups of UEs. In but one non-limiting example, the network operator may determine, or receive information that a particular group (e.g., make/model) of UEs should immediately be denied access to one or more network services (e.g., based on an security breach, vulnerability, or the like). Instead of conventional access management solutions (i.e., adding each individual device to a device-specific grey/black list) or denying access to all devices (i.e., turning the network off completely), modifying access for an entire group is an intermediately-scoped, highly-efficient access management tool that is significantly faster than managing devices a the device-specific level (e.g., based on IMEIs) and more tailored than denying access for all devices (which is exceptionally undesirable), all while protecting the integrity of the operator's network.

The network environment 200 comprises an EIR 214. Though shown as disposed within the network core 210, it is expressly contemplated that the location illustrated in network environment 200 is non-limiting; for example, the EIR 214 may be disposed between the RAN 206 and the core network 210 (i.e., network edge) or may be isolated as a stand-alone module. The EIR 214 is generally configured for determining whether the first UE 202 is whitelisted (permitted to access the desired network service), greylisted (access to the desired network service is controlled; for example, access may be monitored, temporarily suspended, or otherwise restricted), or blacklisted (access to the desired network service or the network, generally, is denied). In aspects, the EIR 214 may communicate with one or more functions or modules in order to affect a particular outcome; for example, in one aspect the EIR 214 may communicate to the AMF 212 that the first UE 202 is on the blacklist, which may cause the AMF 212 to automatically deny or ignore subsequent requests that originate from the first UE 202. In aspects, the EIR 214 may comprise a direct interface (e.g., HTTP2 interface) that permits access (e.g., by a technician in a network operations center or on a customer care team) for querying the EIR 214, including to determine EIR 214 functions or to access/monitor one or more of the whitelist, greylist, and/or blacklist. As noted, the EIR 214 may perform its functions based on a device specific query (e.g., querying the UDR 220 using a device-specific identifier such as an IMEI) and/or based on a group query (e.g., querying the data storage 224 using a group identifier such as device type or SKU).

The network environment 200 may additionally comprise one or more network functions. Generally shown as a first NF 216 and a second NF 218, it is contemplated that the network environment 200 or the core network 210 may have more or fewer NFs; for example, the second NF 218 may be excluded or there may be one or more additional NFs. In aspects, each of the first NF 216 and the second NF 218 may be one selected from a group of NFs comprising: a session management function (SMF), policy control function (PCF), authentication server function (AUSF), application function (AF), network exposure function (NEF), NF repository function (NRF), and a network slice selection function (NSSF).

The network environment 200 comprises a unified data repository (UDR) 220 for storing information relating to access control. The UDR 220 is generally configured to store information relating to subscriber information and access and may be accessible by multiple different NFs in order to perform desirable functions. For example, the UDR 220 may be accessed by the AMF 212 in order to determine subscriber information, accessed by a PCF to obtain policy related data, accessed by a NEF to obtain data that is permitted for exposure to third party applications, and/or accessed by the EIR 214 in order to determine whether a device is on a whitelist, greylist, or blacklist (which may be collectively stored as an EIR subscription tree) or to determine which device group(s) the first UE 202 is a member of. For example, the EIR 214 may, using the device specific identifier of the first UE 202, query the UDR to determine if the device specific identifier is on an access restriction list (i.e., grey- or black list) and/or to determine the one or more device groups associated with the first UE 202. In addition to being accessible by one or more NFs, such as those described herein, the one or more NFs may also write information to the UDR 220. Similar to the AMF 212, the network environment 200 illustrates the UDR 220 according to a version of the 3GPP 5G architecture; in other network architectures, it is expressly conceived that the UDR 220 may take any desirable form of a data repository capable of being written to and accessed by one or more NFs or other functions or modules (e.g., a call session control function). Though not illustrated so as to focus on the novel aspects of the present disclosure, the network environment may comprise a unified data management module (UDM) which may facilitate communication between an NF, function, or module and the UDR 220.

The network environment 200 may also comprise a user plane function (UPF) 222. The UPF 222 is generally configured to facilitate user plane operation relating to packet routing and forwarding, interconnection to a data network, policy enforcement, and data buffering, among others. In aspects where one or more portions of the network environment 200 are not structured according to the 3GPP 5G architecture, the UPF 222 may take other forms, such as a serving/packet gateway (S/PGW). Relevantly, the UPF 222 may be accessed by the first UE 202 in order for the first UE 202 to connect to the IMS core 230 and place (i.e., mobile originating (MO)) or receive (i.e., mobile terminating (MT)) a VoNR, VOLTE, or voice call, generally. In order to facilitate the call, the IMS core 230 may comprise one or more functions of modules; for example, in the 3GPP 5G architecture, the IMS core 230 may comprise at least one call session control function such as a proxy call session control function (P-CSCF) 232, a serving call session control function (S-CSCF), and an interrogating call session control function (I-CSCF). As illustrated in FIG. 2, in some aspects, the S-CSCF and I-CSCF may be combined as an S/I-CSCF 234; in other aspects, these two control functions may take the form of being separate modules, functions, or components. Regardless of their form, the call session control functions of the IMS core 230, such as the P-CSCF 232 and the S/I CSCF 234 are configured to permit the first UE 232 to place a call to a circuit switched domain such as a publically switched telephone network (PSTN) 244 (e.g., a non-VONR/VOLTE voice call) or to a second UE 242 via at least one other IMS network 240 (e.g., a VoNR or VOLTE call). In various non-3GPP 5G architectures, any one or more of the call session control functions may be replaced by one or more components (e.g., service or media gateways) that are configured to support interworking between an IP based transport network accessible by the first UE 202 and a circuit switched domain or other IP based transport network accessible by a destination telephonic device, such as the second UE 242.

In order to determine if the first UE 202 is subjected to a device group access restriction, any one or modules of functions described herein may perform any one or more group access procedures, alone or in combination. In a first group access procedure, the EIR 214 receives an indication that the first UE 202 has requested access to a particular network service, referred to herein as a requested network service. In some aspects, the requested network service may comprise accessing one or more application servers/services. In other aspects, the requested network service may comprise access to another IMS network 240 (e.g., for placing or receiving a VOLTE or VoNR call) or access to the PSTN 244, which may be facilitated by the IMS core 230. In yet other aspects, the requested network service may more generally comprise a voice connection, an SMS connection, a data connection, connection to a roaming/visitor network (i.e., non-home network access), access to a relay (e.g., a small/femto/pico cell), access to a closed subscriber group cell, access to a network slice, and the like. One skilled in the art would appreciate that a network operator could define a particular network service with varying levels of granularity, based on the needs of the carrier, environment, traffic, and the like. In response to receiving an indication, or determining, that the first UE 202 has requested access to the requested network service, the EIR 214 may query the UDR 220. In some aspects, said query may comprise using a device specific identifier of the first UE 202 (e.g., the IMEI) to determine one or more device groups associated with the first UE 202; in other aspects, said query may additionally comprise using the device specific identifier of the first UE 202 to determine if the first UE is on a device specific access restriction list (e.g., a device specific grey- or black list). According to the first procedure, the EIR 214 may subsequently query the data storage 224 with the one or more device groups associated with the first UE 202 in order to determine if the one or more device groups associated with the first UE 202 are on a device group access restriction list. In one illustrative example, it may be determined that the first UE 202 is a member of group 1 because it has brand A and model Z. The data storage 224 may include an entry that group 1 is access restricted (e.g., on a grey list), and therefore may only access certain network services or access network services under certain circumstances. In response to determining that the one or more device groups associated with the first UE 202 is on an access restriction list, the EIR 214 may communicate an access restriction to one or more NFs, which will execute the access restriction.

In a second group access procedure, the EIR 214 may query the data storage 224 and determine that the one or more device groups associated with the first UE 202 is not authorized for the requested network service, wherein the requested network service is a connection to a non-home network RAN 206 (e.g., if the RAN 206 is in the "roaming network"). In aspects of the second procedure, the one or more device groups associated with the first UE 202 may comprise a device type indicator (mobile phone, tablet, IoT device, wearable device, dongle, modem, WLAN router, and the like). Further, the requested network service may be geographically based; for example, if the one or more device groups associated with the first UE 202 indicate that the first UE 202 is non-mobile or likely to operate in a discrete geographic area (e.g., a smart appliance, thermostat, etc.), the data storage 224 may indicate that the one or more device groups are not authorized to connect to international networks or regional networks beyond a region associated with the first UE 202's home location, or not authorized to connect to networks beyond a predetermined operational radius of a home cell. Execution of aspects of the second procedure may specifically benefit the operator by preventing SIM swaps, spamming, or other malicious behavior related to skirting ordinary operator restrictions.

Any procedure may be implemented as a continuous monitoring system or in response to another event. In a continuous monitoring aspect, the EIR 214 may query the data storage 224 for every request by the first UE 202 to access a requested network service (e.g., cell attach/reattach, handoff, new data/voice/SMS session, and the like). In other aspects, any one or more group access procedures described herein may be implemented in response to a determination or in response to receiving an indication that a triggering event has occurred. The triggering event may include a determination that traffic utilization at a particular location (node, tracking area, geographic area, NOC, or the like) is more than a threshold amount (e.g., traffic is greater than 75% capacity (absolute) or has increased by more than 50% over a period of time such as 5, 10, or 60 minutes (relative). The triggering event may include a determination that one or more key performance indicators (KPIs) has degraded greater than a threshold amount (e.g., degraded below a tripwire such as a downlink data rate less than 100 Mbps (absolute method) or degraded more than a threshold percentage, such as 25%, during a period of time, such as 5, 10, or 60 minutes (relative method)). The one or more KPIs may be at least one of a peak data rate, peak spectral efficiency, user-experienced data rate, area traffic capacity, latency in the user plane, connection density, average spectral efficiency, bandwidth, call drop rate, call failure rate, and other related performance factors that impact a wireless network's ability to provide desirable service to a legitimate user device.

Upon a determination that the one or more groups associated with the first UE 202 is on a group access restriction list based on its one or more group identifiers, the network environment 200 may take one or more access restriction actions. The one or more access restriction actions may comprise preventing, limiting, and/or monitoring the provision of the requested network service to the first UE 202, based on the preferences of the network operator. In another aspect, the enforcement action may comprise causing an instruction to be communicated to the device subject to the enforcement action that the device may not communicate a subsequent attach/registration request to the AMF 212 or a call attempt to the IMS core 230. In yet another aspect, the enforcement action may comprise causing a notification to the relevant network operator and/or carrier, wherein the notification comprises information about the suspect device (e.g., permanent device/user identity) and suspect behavior information (how many attach/registration requests have been made (with or without regard to how many failures occurred), call attempts have been made, or SMS attempts have been made within a certain amount of time). In an aspect, the notification may further comprise an input prompt that requires the network operator/carrier (e.g., a technician in a network operation center) to select an action (e.g., no action, add device to gray/black list, suspend device access, monitor device behavior, contact customer/user associated with the permanent device/user identifier, and the like).

Figure 3:
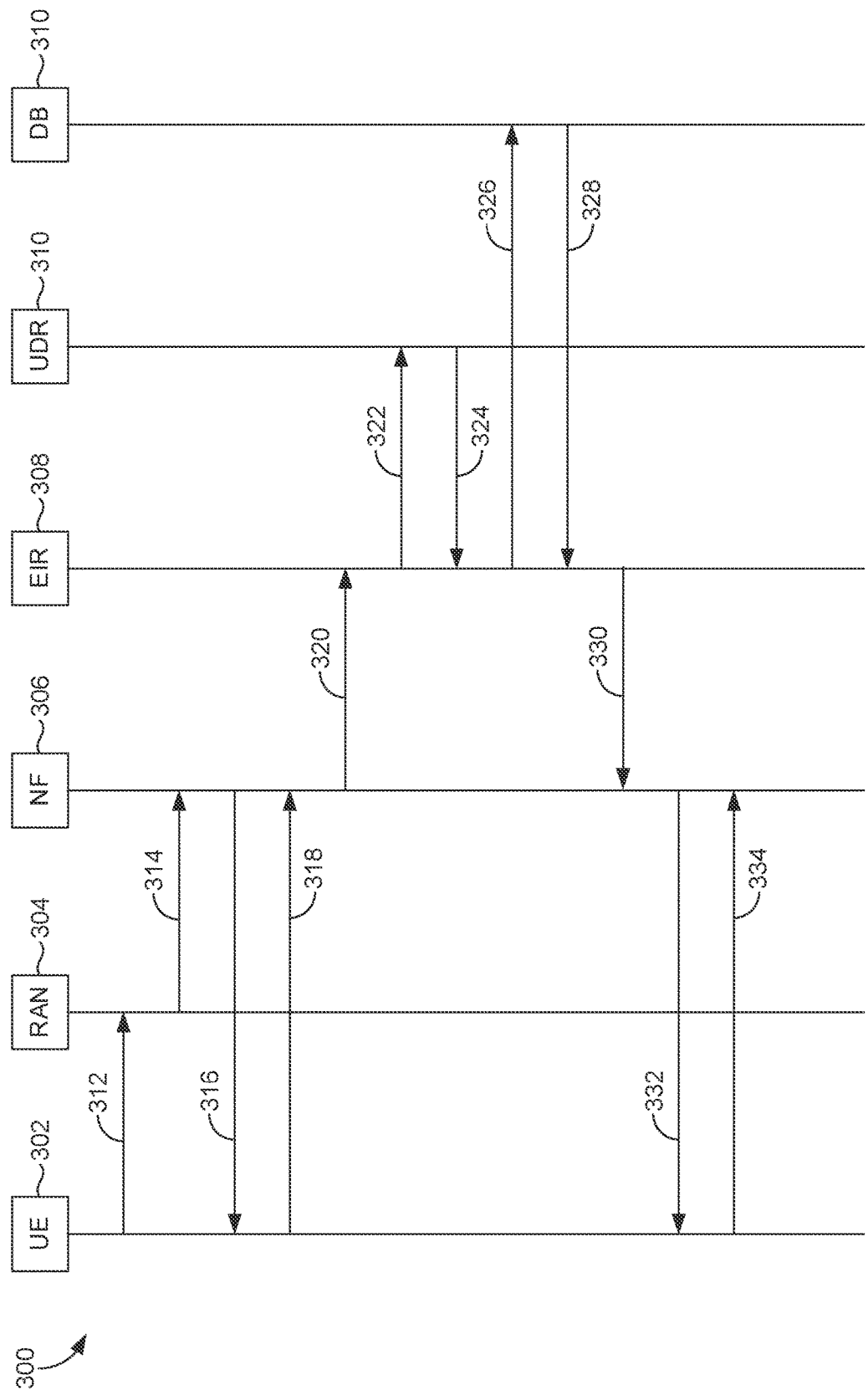
FIG. 3 illustrates a flow diagram of an exemplary method for filtering malicious or rogue devices in which implementations of the present disclosure may be employed.

Turning now to FIG. 3, a call flow diagram is illustrated in accordance with one or more aspects of the present disclosure. A call flow 300 may be said to exist between one or more components discussed in greater detail herein and is not meant to exhaustively show every interaction that would be necessary to practice the invention, so as not to obscure the inventive concept, but is instead meant to illustrate one or more potential interactions between components. The call flow 300 may be relevantly said to include a UE 302 (such as the first UE 202 of FIG. 2), a RAN 304 (such as the RAN 206 of FIG. 2), an NF 306 (such as the AMF 212 or one or more CSCF 232, 234 of FIG. 2), an EIR 308 (such as the EIR 214 of FIG. 2), a UDR 310 (such as the UDR 220 of FIG. 2), and a UE type database 311 (such as the data storage 224 of FIG. 2). At a first step 312, the UE 302 communicates a first request to the RAN 304 to access a requested network service. At a second step 314, the RAN 304 relays the request to the NF 306. In aspects where the network service requested by the UE 302 is a voice call, the NF 306 may take the form of a CSCF; in aspects where the network service requested by the UE 302 is messaging, the NF 306 may take the form of a CSCF of an IPSMGW; in other aspects, such as where the network service requested by the UE 302 is data, the NF 306 may comprise an AMF.

At a third step 316, the NF 306 requests identity information from the UE 302, via the RAN 304. At a fourth step 318, the UE 302 responds with identity information, which may comprise a UE-specific or subscriber-specific identifier (e.g., IMEI, IMSI, subscription concealed identifier (SUCI), subscription public identifier (SUPI), or the like). Though not shown explicitly, the NF 306 may perform one or more operations in order to authenticate the UE 302; however, the call flow 300 relevantly illustrates a fifth step 320, wherein the NF 306 communicates with the EIR 308, an equipment check request, which may then be handled by the EIR 308 in the form of a query at a sixth step 322 to the UDR 310. In response, at a seventh step 324, the UDR will communicate a response back to the EIR 308; in one aspect, said response may comprise an indication of one or more groups associated with the UE 302, for the purposes of conducting a group/type-based query substantially as discussed with respect to FIG. 2. In another aspect, said response may comprise both the group association indication as well as an indication about whether or not the UE 302 is on a device-specific restricted access list (e.g., a grey list or black list). At an eighth step 326, the EIR 308 communicates a group-based query to the UE type database 311, comprising any one or more of the one or more groups associated with the UE 302, which were obtained from the UDR at steps 322 and 324. In response, at a ninth step 328, the UE type database 311 responds with an indication that the UE 302 is either access restricted or non-access restricted, based on the group association(s) of the UE 302. As discussed in greater detail herein, the group-based access restriction may be specific to the requested network service or more generic (e.g., a ban on all non-emergency network services). At a tenth step 330, the EIR 308 communicates any access restrictions to the NF 306, which may execute any necessary access modifications or prohibitions, and respond back to the UE 302 at an eleventh step 332, via the RAN 304. In some aspects, at a twelfth step 334, the UE 302 may subsequently respond back to the NF 306, via the RAN 304, that registration is complete.

Figure 4:
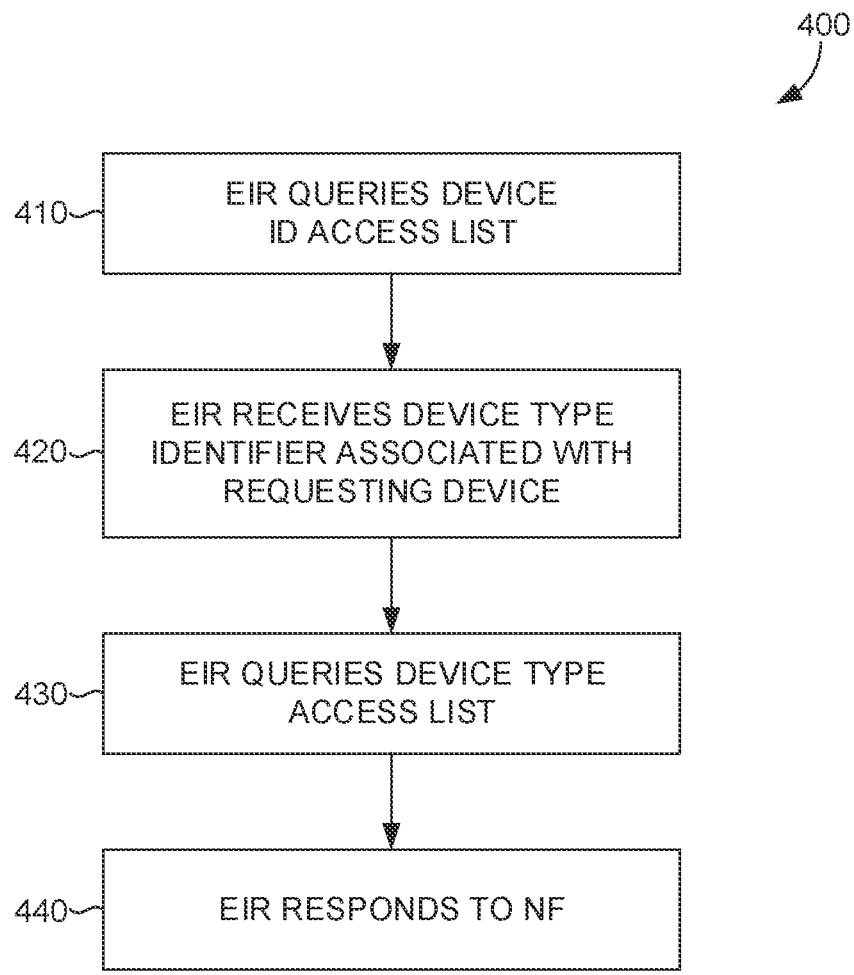
FIG. 4 depicts a flow diagram of an exemplary method for automated blacklisting devices, in accordance with embodiments described herein.

Turning now to FIG. 4, a flow chart is provided that illustrates one or more aspects of the present disclosure relating to a method 400 for group-based filtering of a requested network service. At a first step 410, a networked access management module, such as an EIR 214 of FIG. 2, receives an indication that a UE has requested access to a requested network service, such as any requested network service described with respect to FIG. 2. At a second step 420, the EIR receives a device type identifier associated with the UE, for example as a result of querying a data repository such as the UDR 220 of FIG. 2. At a third step 430, the networked access management module communicates with a device group data repository, such as the data storage 224 of FIG. 2 in order to determine whether the UE is on a group-based access restriction list. At a step 440, the EIR responds to the access request, for example via a response to a network function handling the access request, with an access management action described herein. In aspects, the access management action may comprise allowing the UE to access the requested network service (e.g., if the one or more groups associated with the UE are not on any access restriction list, or if the one or more groups associated with the first UE are on an access restriction list that does not impact the UE's ability to access the requested network service. In another aspect, the access management action may comprise preventing, limiting, and/or monitoring the provision of the requested network service, based on the preferences of the network operator, as described in greater detail with respect to FIGS. 2 and 3.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A method for group-based device filtering in a wireless communication network, the method comprising:
    receiving, at a radio access network, a request for a network service from a user device, wherein the user device is associated with a device specific identifier and a subscriber identifier;
    determining a first attribute group associated with the device specific identifier, the first attribute group comprising a device make and model;
    determining a second attribute group associated with the subscriber identifier, the second attribute group comprising a device make and model;
    querying a first data repository with each of the device specific identifier and the subscriber identifier to determine whether the device specific identifier or the subscriber identifier is permitted to access the network service;
    querying a second data repository with each of the first attribute group and the second attribute group to determine whether each of the first attribute group or the second attribute group is permitted to access the network service; and
    based on said queries, communicating an instruction to the user device that instructs the user device not to communicate a subsequent request for the network service to the radio access network.

2. The method of claim 1, wherein the device specific identifier comprises an international mobile station equipment identity (IMEI).

3. The method of claim 1, wherein determining the first attribute group comprises an access management module querying a data repository, wherein the access management module is remote from the data repository.

4. The method of claim 1, wherein one or more of the first attribute group and the second attribute group indicate the user device is non-mobile.

5. The method of claim 4, wherein one or more of the first attribute group and the second attribute group indicate the user device is an internet of things device.

6. The method of claim 5, wherein the network service comprises wireless access to a network other than a home network associated with the user device.

7. The method of claim 6, further comprises communicating a second instruction that denies an attempt by the user device to access the network other than the home network.

8. The system of claim 5, wherein the network service comprises wireless access to a network cell beyond a predetermined range of a home cell associated with the device specific identifier or the subscriber identifier.

9. The method of claim 1, wherein the network service comprises wireless access to a relay.

10. The method of claim 1, wherein the first attribute group comprises a type allocation code.

11. The method of claim 1, wherein communicating the instruction to the user device is in response to determining that a triggering event has occurred.

12. The method of claim 11, wherein determining that the triggering event has occurred comprises determining that traffic utilization at a particular location is greater than a threshold amount.

13. The method of claim 11, wherein determining that the triggering event has occurred comprises determining traffic utilization has increased greater than a threshold amount over a predetermined period of time.

14. The method of claim 11, wherein determining that the triggering event has occurred comprises determining that one or more key performance indicators (KPIs) has degraded greater than a threshold amount during a predetermined period of time.

15. A system for suspect device filtering in a wireless communication network, the system comprising:
    a first data repository;
    a second data repository;
    a radio access network node; and
    an equipment identity register, wherein the equipment identity register comprises one or more computer components configured to perform a method comprising:
    receiving, via the radio access network node a request from a user device to access a network service;
    determining a device specific identifier and a subscriber identifier associated with the user device;
    determining a first attribute group associated with the device specific identifier, the first attribute group comprising a device make and model;

determining a second attribute group associated with the subscriber identifier, the second attribute group comprising a device make and model;

querying the first data repository with each of the device specific identifier and the subscriber identifier to determine whether the device specific identifier or the subscriber identifier is permitted to access the network service;

querying the second data repository with each of the first attribute group and the second attribute group to determine whether each of the first attribute group or the second attribute group is permitted to access the network service; and based on said queries, communicating an instruction to the user device that instructs the user device not to communicate a subsequent request for the network service.

16. One or more non-transitory computer-readable media having computer-executable instructions embodied thereon that, when executed, cause one or more processors to perform a method comprising:

receiving, at a radio access network, a request for a network service from a user device, wherein the user device is associated with a device specific identifier and a subscriber identifier;

determining a first attribute group associated with the device specific identifier, the first attribute group comprising a device make and model;

determining a second attribute group associated with the subscriber identifier, the second attribute group comprising a device make and model;

querying a first data repository with each of the device specific identifier and the subscriber identifier to determine whether the device specific identifier or the subscriber identifier is permitted to access the network service;

querying a second data repository with each of the first attribute group and the second attribute group to determine whether each of the first attribute group or the second attribute group is permitted to access the network service; and based on said queries, communicating an instruction to the user device that instructs the user device not to communicate a subsequent request for the network service to the radio access network.

* * * * *